(12) United States Patent
Ouyang

(10) Patent No.: US 7,974,085 B2
(45) Date of Patent: Jul. 5, 2011

(54) FOLDABLE ELECTRONIC DEVICE

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/563,251

(22) Filed: Sep. 21, 2009

(65) Prior Publication Data

US 2010/0284131 A1 Nov. 11, 2010

(30) Foreign Application Priority Data

May 11, 2009 (CN) .......................... 2009 1 0302217

(51) Int. Cl.
*H05K 5/00* (2006.01)
*H05K 7/00* (2006.01)
*H04M 1/00* (2006.01)
(52) U.S. Cl. ......... 361/679.27; 361/679.28; 361/679.55; 455/575.1; 455/575.3

(58) Field of Classification Search ............. 361/679.27, 361/679.28, 679.55; 455/575.1, 575.3
See application file for complete search history.

(56) References Cited

U.S. PATENT DOCUMENTS 6,011,699 A * 1/2000 Murray et al. ................ 361/814
7,272,423 B2 * 9/2007 Satoh et al. ................ 455/575.3

* cited by examiner

*Primary Examiner* — Jayprakash N Gandhi
*Assistant Examiner* — Anthony M Haughton
(74) *Attorney, Agent, or Firm* — Steven M. Reiss

(57) ABSTRACT

A foldable electronic device includes a main body, a hollow cylindrical shaft, a cover and a flexible circuit element. The shaft defines a first shaft slot and a second shaft slot, the first and second shaft slots aligned apart and extending from a part of the shaft to one end of the shaft along a direction substantially parallel to an axis of the shaft. The cover is pivoted to the main body via the shaft. The flexible circuit element includes a driving portion fixed to the main body, a controlling portion fixed to the cover, and a connecting portion interconnecting the driving portion and the controlling portion. The connecting portion of the flexible circuit element enters the shaft via the first shaft slot, and passes through the second shaft slot to be out of the shaft.

8 Claims, 5 Drawing Sheets

FOLDABLE ELECTRONIC DEVICE

BACKGROUND

1. Technical Field

The present disclosure relates to electronic devices, and, particularly, to a foldable electronic device such as a mobile phone or a personal digital assistant (PDA).

2. Description of the Related Art

Foldable electronic devices, such as mobile phones, generally have two housings rotatably joined by a hinge that allows one of the housings to fold upon one another. Many such foldable mobile phones have most of the electronics in one of the housings, called the main body, and less electronics in the other housing, called the cover.

A typical foldable electronic device includes a main body, a cover, a hollow cylindrical shaft, and a flexible circuit element. The shaft defines a shaft slot extending from a part of the shaft to one end of the shaft along a direction substantially parallel to an axis of the shaft. The cover is pivoted to the main body via the shaft. One end of the flexible circuit element is fixed to the main body, and the other end of the flexible circuit element is fixed to the cover, wherein a part of the flexible circuit element enters the shaft at one end, and passes through the shaft slot to be exposed to the outside. However, when the cover is rotated relative to the main body many times, the flexible circuit element is liable to be scraped, folded or broken due to the friction with the end of the shaft.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
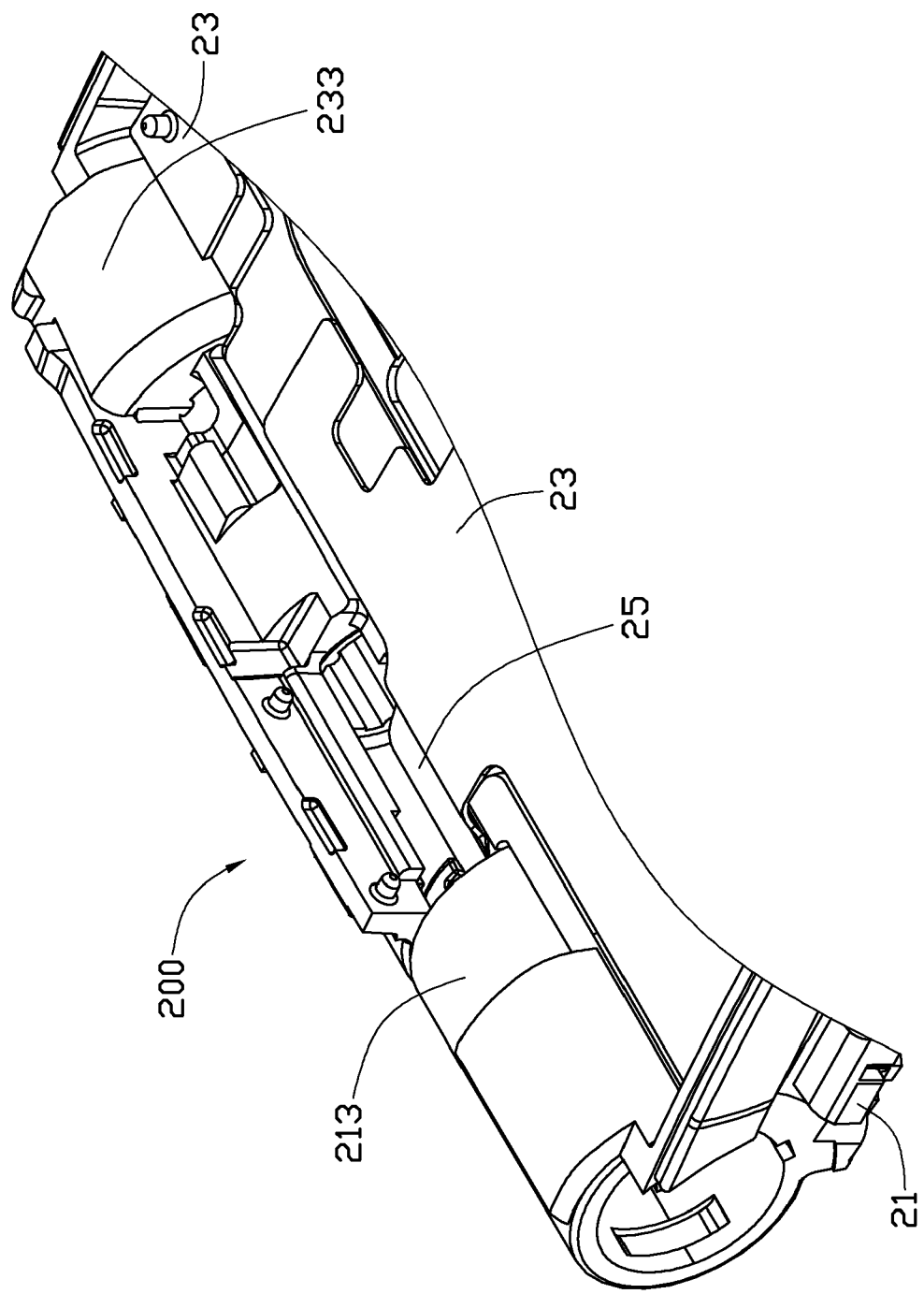
FIG. 1 is a partial, isometric view of an embodiment of a foldable electronic device.
Figure 2:
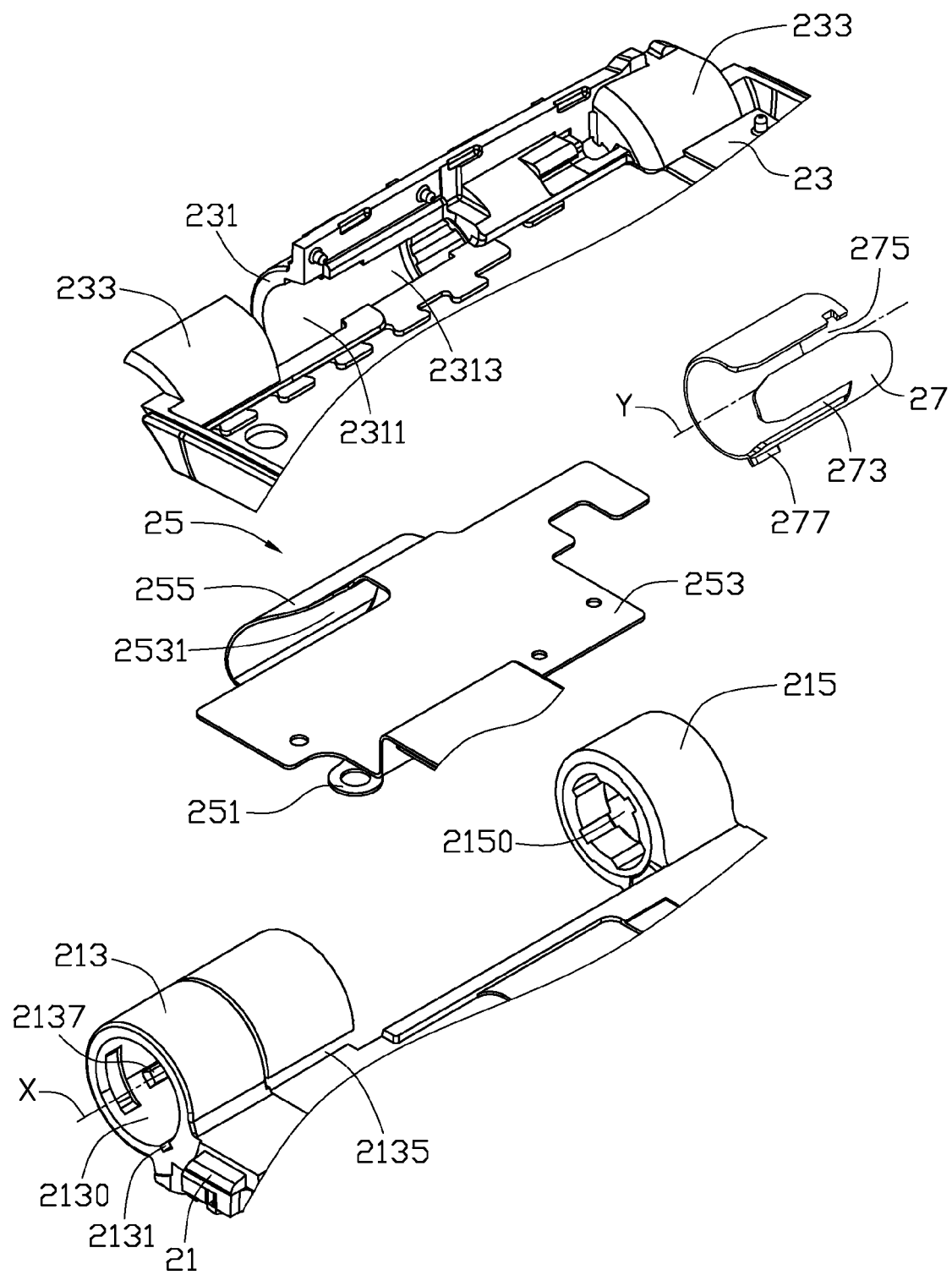
FIG. 2 is a partial, exploded, isometric view of the foldable electronic device of FIG. 1.
Figure 3:
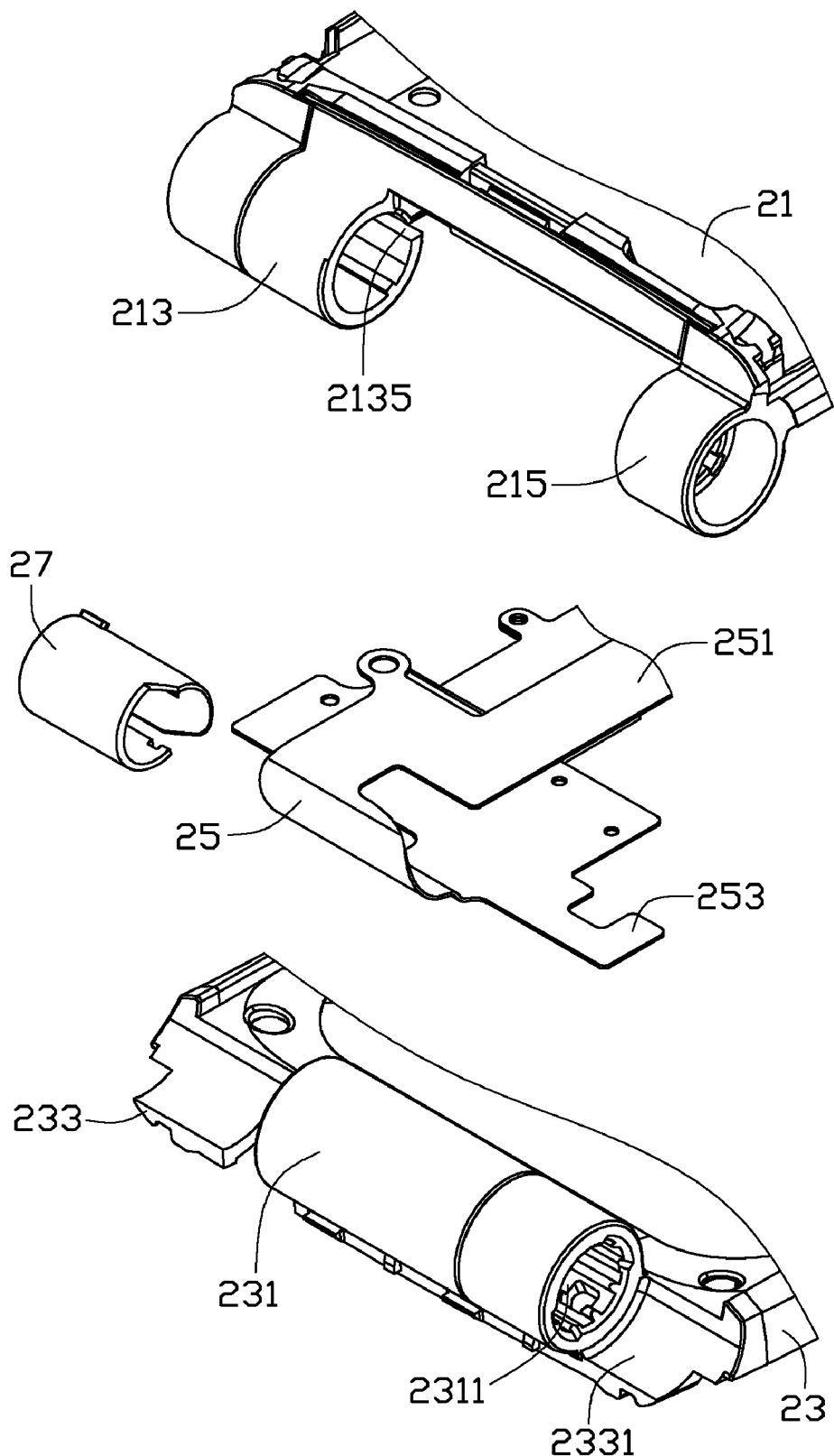
FIG. 3 is similar to FIG. 2, but viewed from another aspect.
Figure 4:
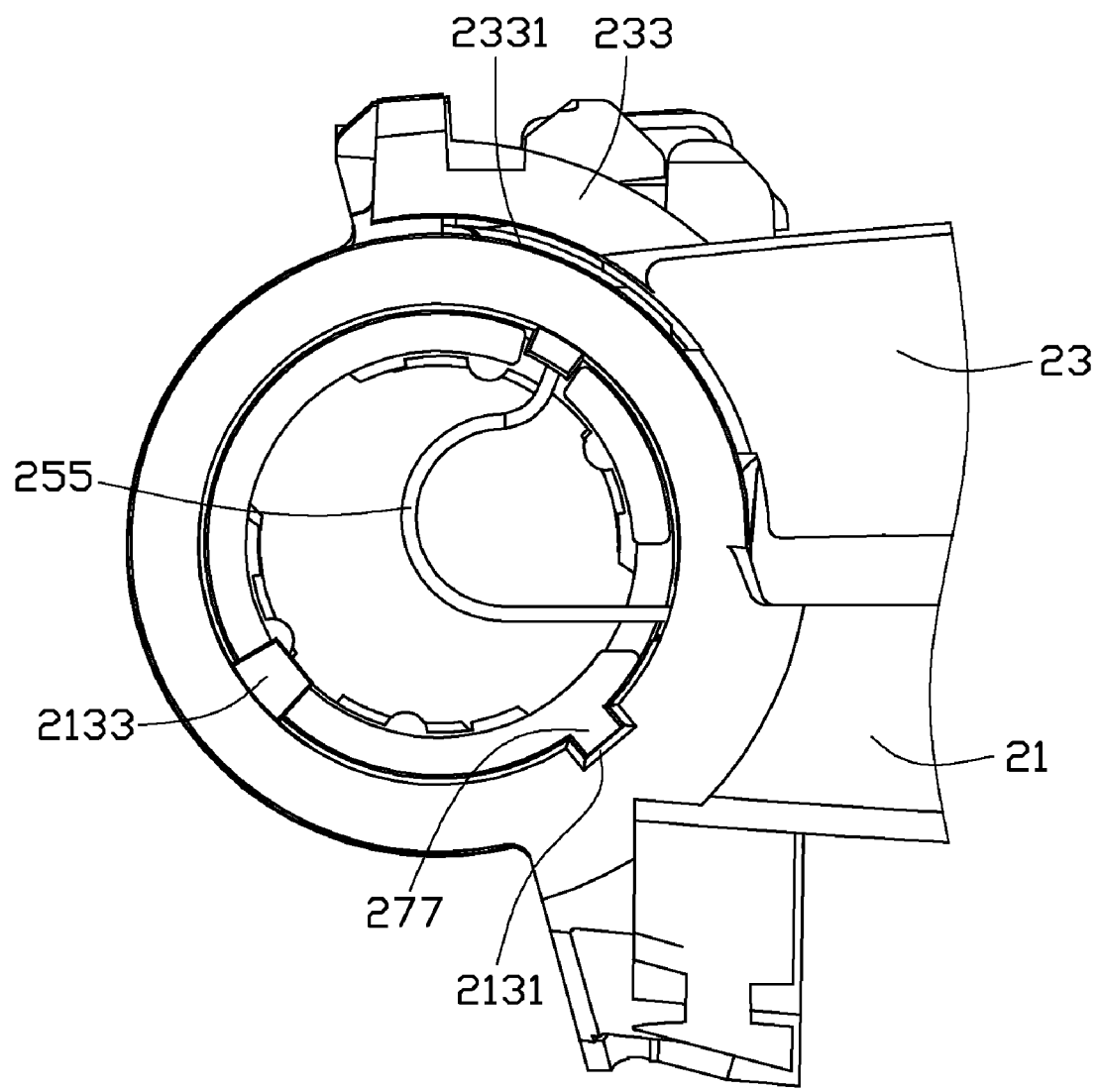
FIG. 4 is a partial, side view of the foldable electronic device of FIG. 1.
Figure 5:
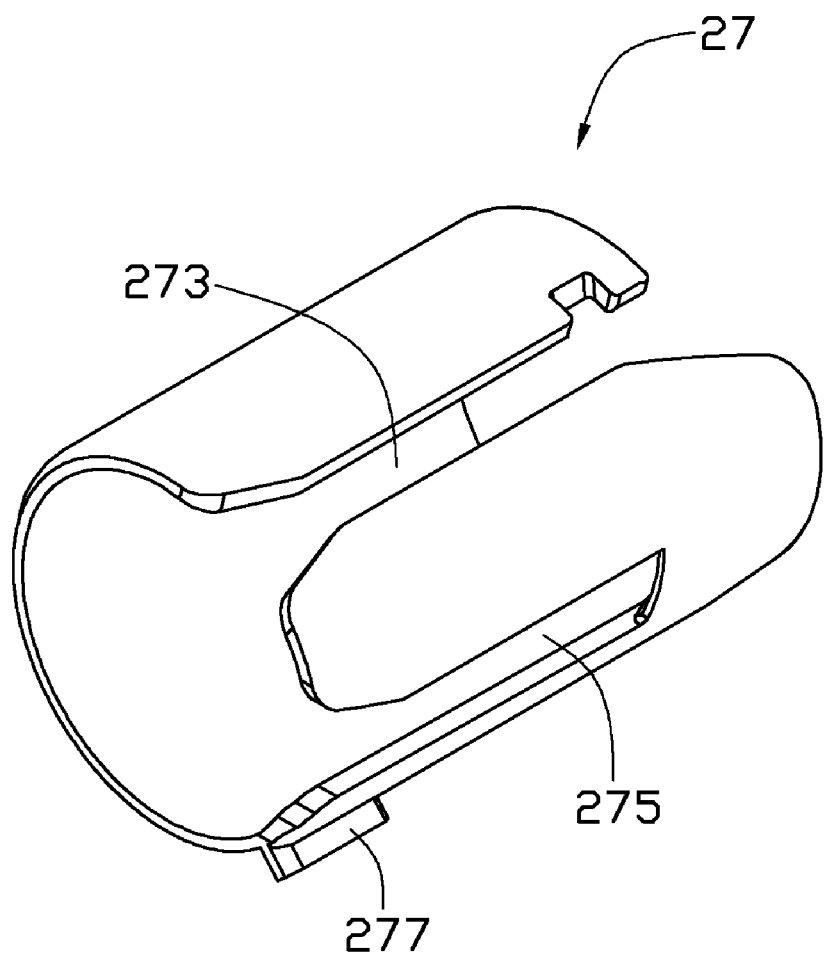
FIG. 5 is an enlarged, isometric view of a shaft of the foldable electronic device of FIG. 1.

Referring to FIGS. 1 through 3, an embodiment of a foldable electronic device 200 includes a main body 21, a cover 23, a flexible circuit element 25, and a shaft 27. The cover 23 is pivoted to the main body 21 via the shaft 27. The foldable electronic device 200 may be a mobile phone, a PDA and the like. The foldable electronic device 200 includes various modules to perform corresponding function and features, however for simplicity, in the following embodiment only the modules related to the flexible circuit element 25 engaged in the foldable electronic device 200 are described. In the illustrated embodiment, the electronic device 200 is a mobile phone.

The main body 21 includes a first knuckle 213 and a second knuckle 215 separately formed at two ends of an end surface of the main body 21. Each of the first and second knuckles 213, 215 is substantially cylindrical. The first knuckle 213 defines a first mounting hole 2130 extending along a center axis X of the first knuckle 213. The first knuckle 213 further includes a latching groove 2131 and a latching protrusion 2133. The latching groove 2131 is defined in an inner surface of the first mounting hole 2130 extending from an end of the first mounting hole 2130 along a direction substantially parallel to the center axis X of the first knuckle 213. The latching protrusion 2137 protrudes out from the inner surface of the first mounting hole 2130 adjacent to the latching groove 2131. The first knuckle 213 further defines an elongated through hole 2135 in the other end of the first knuckle 213 away from the latching groove 2131 to allow the flexible circuit element 25 to pass through. The second knuckle 215 also defines a second mounting hole 2150.

The cover 23 includes a rotary portion 231 and two latching portions 233. The rotary portion 231 is located adjacent to a middle part of one end surface of the cover 23. The two latching portions 233 are respectively located at two sides of the rotary portion 231 at the end surface of the cover 23. The rotary portion 231 is a substantially hollow cylinder. The rotary portion 231 includes a rotary chamber 2311. The rotary portion 231 further defines a cutout 2313 communicating with the rotary chamber 2311 to receive the shaft 27. A length of the rotary portion 231 equals to a distance between the first and second knuckles 213, 215. Each latching portion 233 includes a curved surface 2331. The latching portions 233 can be correspondingly mounted on the first and second knuckles 213, 215, and the curved surfaces 2331 are in full contact with the first and second knuckles 213, 215.

The flexible circuit element 25 includes a driving portion 251, a controlling portion 253, and a connecting portion 255 interconnecting the driving portion 251 and the controlling portion 253. The controlling portion 253 defines a limiting groove 2531 adjacent to the connecting portion 255.

The shaft 27 is a substantially hollow cylinder. The shaft 27 includes a first shaft slot 273, a second shaft slot 275, and a limiting rim 277. Both of the first and second shaft slots 273, 275 are defined in the shaft 27, and each extends from a part of the shaft 27 to one end of the shaft 27 along a direction substantially parallel to a center axis Y of the shaft 27. The first and second shaft slots 273, 275 are spaced apart and parallel to each other. In the illustrated embodiment, the second shaft slot 275 extends from one end of the shaft 27 to the other end of the shaft 27. The limiting rim 277 protrudes out from an outer surface of the shaft 27 parallel to the first shaft slot 273 and adjacent to an end of the first shaft slot 273.

In assembling, the connecting portion 255 of the flexible circuit element 25 is firstly bent, and then a part of the connecting portion 255 is received into the first mounting hole 2130. At this time, a part of the connecting portion 255 of the flexible circuit element 25 adjacent to the driving portion 251 is inserted through the first elongated through hole 2135 of the main body 21. The flexible circuit element 25 is pushed toward the first knuckle 213, such that an end of the first knuckle 213 adjacent to the second knuckle 215 is inserted into the limiting groove 2531. The driving portion 251 of the flexible circuit element 25 is then fixed to the main body 21. Next, another part of the connecting portion 255 out of the first mounting hole 2130 is received into the rotary portion of the cover 23 and the rotary portion 231 is placed between the first and second knuckles 213, 215. The two latching portions 233 are then correspondingly mounted on the first and second knuckles 213, 215.

Next, the shaft 27 is inserted into the rotary portion 231 via the second elongated cutout 2313. At this time, an end of the shaft 27 defining the first shaft slot 273 is positioned adjacent to the first knuckle 213 and the limiting rim 277 of the shaft 27 corresponds to the latching groove 2131. Next, the shaft 27 in the rotary portion 231 of the cover 23 is pushed toward the first knuckle 213 until the latching protrusion 2137 blocks the end of the shaft 27. At this time, the connecting portion 255 then enters the shaft 27 via the first shaft slot 273, and passes through the second shaft slot 275 to be out of the shaft 27. The limiting rim 277 is then engaged into the latching groove 2131 of the first knuckle 213. The latching protrusion 2137 blocks the end of the shaft 27 to prevent the shaft 27 from being detached out of the first knuckle 213. Finally, the controlling portion 253 of the flexible circuit element 25 is fixed to the cover 23.

If the cover 23 is rotated relative to the main body 21, the shaft 27 may rotatably move and be in contact with an inner surface of the rotary portion 231. During the rotation of the shaft 27 and the rotary portion 231, the flexible circuit element will not be scraped by the end of the shaft 27, and will not be folded or broken. In addition, the connecting portion 255 of the flexible circuit element 25 is limited in the shaft 27, this decreasing the opportunity of friction with the rotary portion 231 and the first knuckle 213. Furthermore, because a part of the typical flexible circuit element of the typical foldable electronic device is still at a side of the end of the shaft, this requires more setup space. Compared with the typical foldable electronic device, the foldable electronic device 200 reduces the setup space to make a relative thin configuration.

It is to be understood that the foldable electronic device 200 may further include a second shaft rotatably mounted between the rotary chamber 2311 and the second mounting hole 2150 of the second knuckle 215.

It should be pointed out that the limiting groove 2531 of the controlling portion 253 can be omitted, as long as the first shaft slot 273 is longer enough to pass through the flexible circuit element 25.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A foldable electronic device, comprising:
    a main body;
    a hollow cylindrical shaft, the shaft including a curved peripheral wall, the curved peripheral wall defining a first shaft slot and a second shaft slot therein, the first and second shaft slots aligned apart and extending from a part of the shaft to one end of the shaft along a direction substantially parallel to an axis of the shaft;
    a cover pivoted to the main body via the shaft; and
    a flexible circuit element comprising a driving portion fixed to the main body, a controlling portion fixed to the cover, and a connecting portion interconnecting the driving portion and the controlling portion, the driving portion being substantially parallel to the controlling portion, the connecting portion being a curved sheet having two ends, one end of the connecting portion passing through the first shaft slot and the other end of the connecting portion passing through the second shaft slot.

2. The foldable electronic device of claim 1, wherein the main body comprises a first knuckle formed at one end of an end surface thereof, the first knuckle defining a first mounting hole extending along a center axis thereof; the cover comprises a rotary portion, the rotary portion defining a rotary chamber; and the shaft is rotatably engaged between the first mounting hole and the rotary chamber.

3. The foldable electronic device of claim 2, wherein the first knuckle further comprises a latching groove defined in an inner surface of the first mounting hole extending from an end of the first mounting hole along a direction substantially parallel to a center axis thereof, and a latching protrusion protruding out from the inner surface of the first mounting hole adjacent to the latching groove to block the flexible circuit element.

4. The foldable electronic device of claim 3, wherein the shaft further comprises a limiting rim protruding out from an outer surface thereof parallel to the first shaft slot and adjacent to an end of the first shaft slot, the limiting rim engaged in the latching groove of the first knuckle.

5. The foldable electronic device of claim 3, wherein the first knuckle further defines an elongated through hole in the other end of the first knuckle away from the latching groove to pass through the flexible circuit element.

6. The foldable electronic device of claim 1, wherein the controlling portion of the flexible circuit element defines a limiting groove adjacent to the connecting portion; an end of the first knuckle is inserted into the limiting groove.

7. The foldable electronic device of claim 1, wherein the rotary portion defines a cutout communicating with the rotary chamber.

8. The foldable electronic device of claim 1, wherein the second shaft slot extends from one end of the shaft to the other end of the shaft.

* * * * *